US005625372A

United States Patent [19]
Hildebrand et al.

[11] Patent Number: 5,625,372
[45] Date of Patent: Apr. 29, 1997

[54] COMPACT COMPOUND MAGNIFIED VIRTUAL IMAGE ELECTRONIC DISPLAY

[75] Inventors: Alfred P. Hildebrand, Palo Alto; Gregory J. Kintz, Mountain View, both of Calif.

[73] Assignee: Siliscape, Inc., Palo Alto, Calif.

[21] Appl. No.: 407,102

[22] Filed: Mar. 17, 1995

Related U.S. Application Data

[63] Continuation-in-part of Ser. No. 361,035, Dec. 21, 1994.

[51] Int. Cl.[6] .............................. G09G 3/20; G02B 27/01
[52] U.S. Cl. ............................................. 345/8; 359/630
[58] Field of Search .......................... 345/7–9; 348/51, 348/53; 359/471, 473, 479, 630, 631

[56] References Cited

U.S. PATENT DOCUMENTS

| | | |
|---|---|---|
| 3,296,509 | 1/1967 | Katchman . |
| 4,717,248 | 1/1988 | LaRussa . |
| 4,859,031 | 8/1989 | Berman et al. . |
| 5,087,166 | 2/1992 | Taylor, II . |
| 5,157,503 | 10/1992 | Dugdale . |
| 5,291,338 | 3/1994 | Bezard et al. . |
| 5,305,124 | 4/1994 | Chern et al. . |
| 5,357,372 | 10/1994 | Chen et al. . |
| 5,369,415 | 11/1994 | Richard et al. ............................ 345/7 |
| 5,467,104 | 11/1995 | Furness, III et al. ........................ 345/8 |
| 5,467,215 | 11/1995 | Lebby et al. . |
| 5,486,946 | 1/1996 | Jachimowicz et al. . |
| 5,491,491 | 2/1996 | Lebby et al. ................................ 345/7 |
| 5,499,138 | 3/1996 | Iba ............................................. 345/8 |

FOREIGN PATENT DOCUMENTS

| | | |
|---|---|---|
| 0566000A1 | 4/1993 | European Pat. Off. . |
| 0566001A2 | 4/1993 | European Pat. Off. . |
| 0566002A1 | 4/1993 | European Pat. Off. . |
| 2004383 | 8/1978 | United Kingdom . |

OTHER PUBLICATIONS

Young, "Head–Mounted Display", IBM Technical Disclosure Bulletin, vol. 25, No. 12, pp. 6373–6374 (May 1983).

*Primary Examiner*—Jeffery Brier
*Attorney, Agent, or Firm*—Wilson Sonsini Goodrich & Rosati

[57] ABSTRACT

A compact virtual image electronic display system is provided which includes a microdisplay for producing a source object. A first magnification optic magnifies the source object and reflects a magnified virtual image. A second magnification optic provides a compound magnified virtual image of the magnified virtual image to an observer. The source object is within the full field of view provided by the second magnification optic. A control mechanism provides control signals to the microdisplay which modify the source object produced by the microdisplay.

30 Claims, 10 Drawing Sheets

COMPACT COMPOUND MAGNIFIED VIRTUAL IMAGE ELECTRONIC DISPLAY

RELATIONSHIP TO COPENDING APPLICATION

This application is a continuation-in-part of "Miniature Synthesized Virtual Image Electronic Display," application Ser. No.: 08/361,035; Filed: Dec. 21, 1994, which is incorporated herein by reference.

BACKGROUND OF THE INVENTION

1. Field of the Invention

The invention generally relates to a compact electronic display system. More specifically, the invention relates to a compact electronic display system which provides a virtual image of a microdisplay that has been magnified using two stages of magnification optics where one of the magnification optics is reflective and is used to fold the optical train of the electronic display onto itself.

2. Description of Related Art

A continuing objective in the field of electronics is the miniaturization of electronic devices. Most electronic devices include an electronic display. As a result, the miniaturization of electronic displays is critical to the production of a wide variety of compact electronic devices.

The purpose of an electronic display is to provide the eye with a visual image of certain information. This visual image may be provided as either a real image or a virtual image. A real image refers to an image which is observed directly by the unaided human eye. A photograph is an example of a real image. Electronic displays which provide a real image generally provide some form of display surface on which the real image is formed and viewed. A real image exists at a given location when, if a viewing surface is positioned at this location, a real image can be observed by the unaided eye. Examples of electronic displays which provide real images include liquid crystal displays, CRT monitors, and projection screens.

In real image electronic displays, the image viewed by the observer is an image created on or projected onto a display surface. As a result, the size of the display surface limits the size of the image that can be provided to the observer. Compact electronic devices, because of their small size, have limited space for a display surface and therefore are only able to accommodate a relatively small display image.

A relatively small display image creates a series of problems for the person viewing the image. The human eye is only able to resolve a limited amount of detail in an image. Two objects can be resolved by the eye as separate objects only when they are separated by a certain minimum angle as measured from the eye. The unaided human eye can resolve objects with an angle of separation of approximately 1–2 arc minutes or more.

The human eye also has difficulty focusing on source objects at very short distances from the eye without causing eye strain. The near point for the unaided human eye is defined as the closest distance that the eye can focus on an object without causing eye strain. The near point for the unaided human eye is about 25 cm for an average middle aged adult. The near point is much longer for an older adult and can be as long as 100 cm.

The display surface of a real image electronic display generally includes an array of small objects, called pixels, which form a real image on the display surface. For the reasons described above, the resolution of the unaided human eye and the near point of the eye determine the minimum pixel size that the unaided human eye can resolve. For an electronic display located at the near point for an average middle aged adult, the minimum separation between pixels that can be resolved by the unaided eye is about $75 \times 10^{-4}$ cm, or 75 microns. In order to accommodate for variations in the human eye, the minimum separation between pixels in a real image electronic display should preferably be larger than the minimum resolvable pixel size.

For small real image electronic displays, the display must be viewed at a distance close to the near point of the eye in order to provide the observer with a significant amount of information. As a result, the observer must focus his or her eyes on the small display. The need to focus on a small display each time the electronic display is used creates discomfort and eventually, unwanted eye strain on the observer. The problem of eye strain becomes particularly acute when the observer is only intermittently focusing on the electronic display. It therefore is desirable to employ an electronic display which minimizes the observer's need to refocus his or her eyes in order to view the electronic display.

Another important property of the human eye which determines the utility of an electronic display is the eye's angular field of view of an image. The eye can see over a field of view of up to 100 degrees. The full field of view, as it is referred to herein, is the circular field of view around the axis of the eye having a diameter equal to the largest dimension of the image being viewed. However, beyond 10–15 degrees from the center of the field, the resolution degrades significantly. A comfortable field of view for normal electronic display surfaces is typically in the range of 20–40 degrees. For real image displays, the field of view is defined as the ratio between the largest dimension of the display surface and the distance from the eye to the display. An example of a display surface with such a field of view would be a TV screen with a 100 cm diagonal viewed at 150 cm. The human eye compensates for the lower resolution at the edges of the display surface by scanning the eye across the display. The scanning of the eye is called eye roll. The eye roll moves the pupil of the eye. The typical distance for the motion of the pupil of an adult is about 1 cm.

An optical system can produce both real and virtual images. Several examples of electronic displays that provide a real image were discussed above. By contrast to a real image, a virtual image is an image which, if a viewing surface were positioned at the location of the virtual image, no image would be observed by the eye. An example of a virtual image is the image of fine print viewed through a magnifying glass. The print not only appears larger, it also appears to be located substantially behind the surface where the print actually exists. By definition, a virtual image can exist at a location where no display surface exists. The size of the virtual image therefore is not limited by the size of a display surface. Virtual image electronic displays thus have the advantage of eliminating the need for a large display surface in order to produce a large electronic image.

A virtual image electronic display must initially form a source object which is then imaged by an optical system to create the virtual image. A substantial advantage of a virtual image electronic display is that the source object initially created may be as small as can be usefully reimaged by the optical system. As a result, virtual image electronic displays may effectively utilize very small microdisplays to form the source object. Pixel sizes may be as small as a few microns in diameter, a size which the unaided eye cannot resolve. Rather, in order to view the source object formed by the microdisplay, substantial magnification of the optical system is required.

A virtual image must be created by an optical system of some kind. In a real image electronic display, it is the eye and the viewing surface properties which determine the viewing parameters. By contrast, in a virtual image display, the optical system determines most of the viewing parameters.

There are three important parameters relating to the ease of viewing the image associated with virtual image displays. The first parameter is the far point which refers to the maximum distance from the eye which the optical system can be held and have the eye still see the entire virtual image. Optical devices which provide a far point which is a short distance from the optic are undesirable due to the inconvenience and discomfort associated with placing the eye in close proximity with the optic. It is therefore preferred that an optic provide a long far point in order to enable the magnified image to be viewed through the optic at a comfortable and convenient range of distances from the optic.

The second parameter relating to the ease of viewing a virtual image is the apparent angular width of the virtual image, commonly referred to as the field of view of the virtual image. The full field of view is defined as the ratio of the largest apparent dimension of the virtual image to the apparent distance to the virtual image. It is generally equivalent to the field of view for a real image display surface.

The third parameter relating to the ease of viewing a virtual image is the transverse distance that the eye may move with respect to the optical system and still have the eye see the entire virtual image through the optical system.

A variety of electronic display systems have been developed for providing a virtual image to the observer. Virtual image electronic display systems may generally be divided into two broad classes, on-axis display systems and off-axis display systems. An on-axis display system refers to a system having components symmetrical about a common optical axis. In a typical on-axis system, any of the component(s) forming the on-axis display system can be rotated about the optical axis without disturbing the display system.

On-axis display systems provide the advantage of producing virtual images with a minimal amount of aberrations. However, on-axis display systems have the disadvantage of being spatially inefficient due to the linear arrangement of the optical components.

By contrast, off-axis display systems refer to display systems where one or more components are positioned such that the symmetry around the optical axis is removed. Any optical system that includes tilted or displaced optics is an off-axis optical system as that term is used herein. By placing one or more components off-axis, off-axis display systems can be adapted to efficiently fit within the contours of the devices in which they are used. However, off-axis display systems have the disadvantage that redirecting an image off-axis introduces aberrations into the image which can significantly deteriorate the image quality produced. The image quality can frequently be enhanced using additional optical elements which reduce the significance of the aberrations. However, these additional optical elements add to the size, complexity and cost of the display.

Off-axis display systems commonly employ optical components having a reflective optical surface, such as a concave reflective mirror, in order to redirect the optical train off-axis. Examples of prior art off-axis electronic display systems employing a reflective element include U.S. Pat. No. 3,296,509, U.S. Pat. No. 4,717,248, U.S. Pat. No. 5,087,166, U.S. Pat. No. 5,157,503, U.S. Pat. No. 5,291,338, U.S. Pat. No. 5,305,124 and U.S. Pat. No. 5,357,372.

One problem associated with the use of a reflective optical surface is that the optical path on the object side of the surface and the optical path on the image side of the surface traverse the same physical space. This problem is generally avoided through the use of a second reflective surface, such as a beam splitter, or an optical element, such as an optical grating, which diverts the reflected image of the object off-axis.

The use of a beam splitter or optical grating to divert a reflected image off-axis has several disadvantages. Redirecting an optical image off-axis tends to introduce aberrations into the image which reduces the image quality of the image. Beam splitters and optical gratings also do not transmit all of the light to the observer and thus reduce the transmissivity and ultimately the brightness of the virtual image seen by the observer. For example, U.S. Pat. No. 4,859,031 teaches an optical collimating apparatus for use in a head-up display which transmits an image from an image source with a light efficiency of 4.95%. This low level of light efficiency is due, in part, to the use of a semi-reflective concave mirror, a circular polarizing filter and a transmitter/combiner which each cause 50% of the light intensity of the image to be lost.

A significant advantage associated with compact electronic displays is the fact that they are portable. It is therefore impractical and disadvantageous for a compact electronic display to rely on an external power source. The illumination source used in the electronic display generally requires the greatest amount of energy of the various components used in the electronic display. It is therefore important that the electronic display have an optical design which efficiently uses the illumination source used to form the virtual image.

A need also currently exists for an inexpensive, compact virtual image electronic display that is positionable within a small volume, that provides the observer with a large field of view, a virtual image with a significant degree of eye relief and a large translational distance. In particular, an electronic display system is currently needed which combines the image quality and light efficiency advantages of an on-axis display system with the spacial efficiency provided by off-axis display systems.

SUMMARY OF THE INVENTION

A compact, virtual image electronic display system is provided for forming a compound magnified virtual image of a source object. The display system includes a microdisplay for producing the source object, a first magnification optic which includes a magnification function and a reflection function, and a second magnification optic which, in combination with the first magnification optic forms a compound magnified virtual image.

The microdisplay and the first magnification optic each have a centerpoint which serves to define a first optical axis. The first magnification optic magnifies the source object and reflects a magnified virtual image, the center of the magnified virtual image defining a second optical axis, the second optical axis being at an angle $\phi$ relative to the first optical axis. The second magnification optic provides a compound magnified virtual image of the magnified virtual image within the full field of view to an observer. By making the angle between the first and second optical axes sufficiently small that the source object is within the full field of view provided by the second magnification optic, the spacing between the first and second magnification optic is reduced to less than about 15 mm and more preferably less than about 8 mm. As a result, the thickness of the display system along the first optical axis is reduced to less than about 20 mm and more preferably less than about 10 mm. Meanwhile, the display system provides a compound magnified virtual image which is magnified relative to the source object by a factor of at least about 10 and more preferably by a factor of at least about 20. In addition, because the display system is designed to direct most of the imaging light toward the observer's eye, the amount of light needed to illuminate the exit pupil of the device is significantly smaller than traditional displays. In a preferred embodiment, the angle between the first and second optical axes is equal to or less than about 10° and more preferably equal to or less than about 5°. At these smaller angles, the amount of aberrations in the compound magnified virtual image are significantly reduced.

The microdisplay may be any electronically controllable microdisplay. The microdisplay is preferably a light transmissive microdisplay and is more preferably a liquid crystal display. In a particularly preferred embodiment, the microdisplay is a light transmissive microdisplay and the display system is arranged such that the light transmissive microdisplay is within the full field of view of the compound magnified virtual image. According to this embodiment, the observer effectively looks through the microdisplay when viewing the compound magnified virtual image, assuming the second magnification optic is spherically shaped.

The microdisplay preferably forms a source object having an area equal to or less than 400 mm². The microdisplay is also preferably formed of an array of pixels where each pixel has an area equal to or less than about 0.25 mm².

The microdisplay is preferably positioned within about 8 mm of either refractive surface of the second magnification optic. For example, the microdisplay may be positioned between the observer and the proximal refractive surface of the second magnification optic. According to this embodiment, the first and second magnification optics form a doublet magnification optic. The microdisplay may be positioned between the first magnification optic and the distal refractive surface of the second magnification optic. The microdisplay is more preferably positioned adjacent (equal to or less than about 3 mm) to a refractive surface of the second magnification optic. Alternatively, the microdisplay may be positioned within the second magnification optic.

The first and second magnification optics may be selected such that the second magnification optic reduces the degree of field curvature introduced by the first magnification optic and preferably substantially eliminates field curvature introduced by the first magnification optic.

The first magnification optic may optionally further include a refractive surface proximal to the observer and a reflective surface distal to the observer. The first magnification optic may also optionally further include a partially reflective surface such that the observer viewing the compound magnified virtual image can also visualize real objects through the first magnification optic. This embodiment of the first magnification optic is useful in the design of a head-up display system.

In a further, preferred embodiment, the display system includes an eye position sensor system which enables the observer to use his or her eye to interact with a control device which controls the source object produced by the microdisplay and/or functions that the display system performs.

BRIEF DESCRIPTION OF THE DRAWINGS

FIGS. 7a and 7b illustrate an expandable and contractible display system in which FIG. 7a illustrates the display system in its contracted state and FIG. 7b illustrates the display system in its expanded state.

DESCRIPTION OF THE PREFERRED EMBODIMENTS

Figure 1:
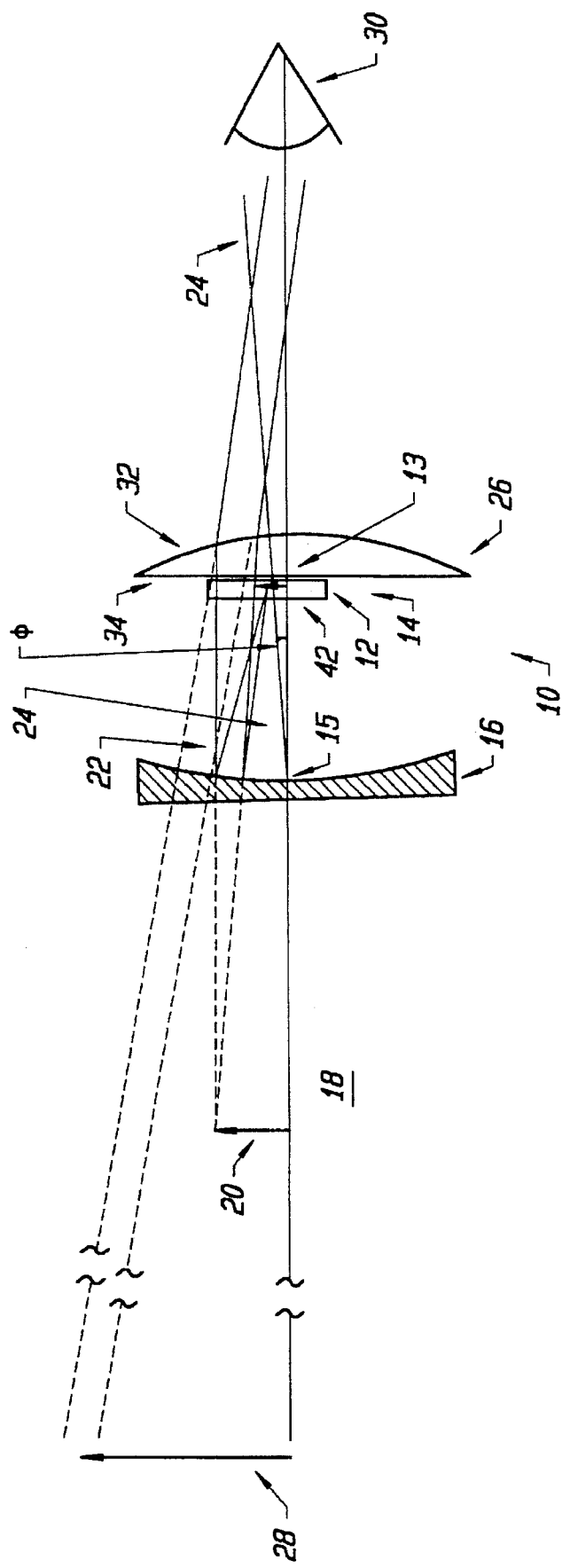
FIG. 1 illustrates a compact virtual image electronic display system according to the present invention in which the microdisplay is positioned adjacent the distal surface of the second magnification optic.

The present invention relates to an inexpensive, compact virtual image electronic display which provides a magnified virtual image of a source object formed by a microdisplay using two stages of magnification optics where one of the magnification optics is reflective and is used to fold the optical train of the display onto itself, thereby enabling the display system to be housed in a compact volume. More specifically, as illustrated in FIG. 1, the present invention provides a virtual image electronic display system 10 which includes a microdisplay 12 for producing a source object 14. The display system also includes a first magnification optic 16 positioned along a first optical axis 18, the first optical axis being defined by the centerpoint 13 of microdisplay 12 and the centerpoint 15 of the first magnification optic 16. The source object 14 is projected toward first magnification optic 16 and is centered upon the first optical axis 18.

Incorporated into the first magnification optic is a magnification function and a reflection function such that the first magnification optic 16 images the source object 14 and provides a magnified virtual image 20 of the source object 14 in the direction of the observer 30. The center of the imaging rays 22 forming the magnified virtual image 20 define a second optical axis 24 that is at an angle φ relative to the first optical axis 18. The displacement angle φ of the second optical axis 24 relative to the first optical axis 18 is equal to twice the tilt angle of the normal to the center of curvature of the first magnification optic if the optic is tilted. The displacement angle φ is also equal to twice the distance of the normal to the center of curvature of the first magnification optic 16 divided by the radius of curvature of the first magnification optic 16 if the first magnification optic 16 is off center.

The virtual image electronic display system also includes a second magnification optic 26 which receives the magnified virtual image 20 and provides a compound magnified virtual image 28 of the source object 14 to the observer 30 within the full field of view.

Figure 2:
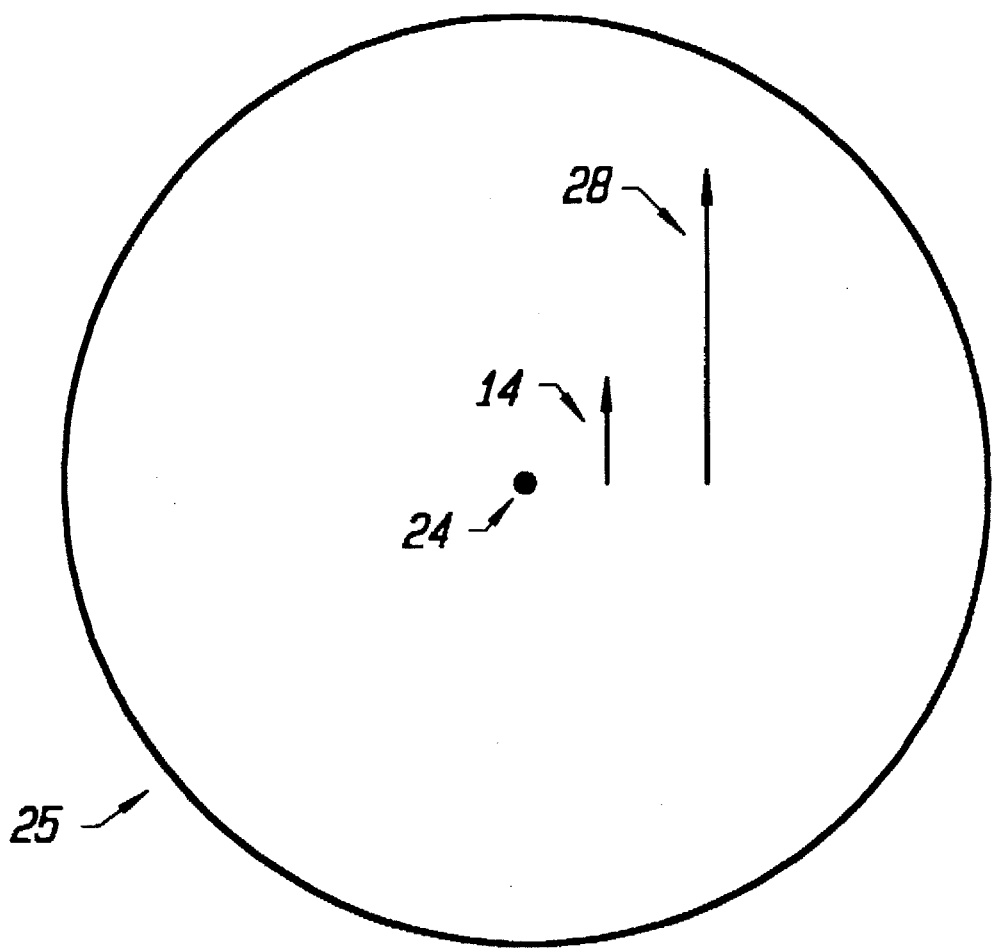
FIG. 2 illustrates the alignment of the second optical axis relative to the first optical axis such that the source object produced by the microdisplay is within the full field of view of the compound magnified virtual image.

As illustrated in FIG. 2, the second optical axis is preferably aligned relative to the first optical axis such that the source object 14 produced by the microdisplay 12 is within the full field of view 25 of the second magnification optic 26. This generally requires that φ be less than about 40°. According to this embodiment, the observer effectively looks through the microdisplay when viewing the compound magnified virtual image 28. By full field of view, it is intended that if one were to block a portion of the field of view 25 illustrated in FIG. 2 such that the observer is not effectively looking through the microdisplay when viewing the compound magnified virtual image 28, the full field of view nonetheless refers to the enitre circular field of view as illustrated in FIG. 2.

In a preferred embodiment, the angle between the first and second optical axes is equal to or less than about 10° and more preferably equal to or less than about 5°. At these smaller angles, the amount of aberrations in the compound magnified virtual image are significanty reduced.

Unlike conventional virtual image display systems, the present invention uses a reflective magnification optic which folds the optical train of the display system onto itself without the need for further reflective optics or beam splitters to divert the optical path of the reflected image relative to the source object. As a result, the spacing between the components employed in the synthesized display of the present invention is significantly reduced such that the display can be positioned within a small space. For example, by using a reflective optic as the first magnification optic, the spacing between the first and second magnification optic is reduced to less than about 15 mm and preferably less than about 8 mm. As a result, the thickness of the display system along the first optical axis is reduced to less than about 20 mm and preferably less than about 10 mm.

In addition, by using two stages of magnification, the components used in the display system can also be reduced in size. According to the present invention, the electronic display is preferably positionable within a volume equal to or less than about 75 cubic centimeters, most preferably equal to or less than about 37.5 cubic centimeters.

The use of a reflective magnification optic provides the additional advantage of increasing the light efficiency of the display system by avoiding light loss that would otherwise occur with the use of beam splitters, optical gratings and other redirecting optics. In addition, by using a first and second magnification optic, each optic may be selected to correct aberrations introduced by the other optic including, but not limited to spherical aberrations, astigmatism, coma, distortion and field curvature.

The electronic display system preferably provides an eye relief equal to or greater than about 15 mm, more preferably equal to or greater than about 25 mm, most preferably equal to or greater than about 35 mm. The electronic display also preferably provides an image which is at least equivalent in size to a computer monitor (24 cm×18 cm) when viewed at 50 cm. This size is roughly equivalent to a large screen TV (100 cm diagonal) when viewed at 165 cm. The electronic display also preferably provides about a 34° field of view (17° to either side of the central optical axis).

The electronic display system is intended as an inexpensive electronic component which may be incorporated into any electronic device in which an electronic display is used. In particular, the display system is designed for use in pocket-sized electronic devices. Examples of such devices include, but are not limited to, portable computers, personal communicators, personal digital assistants, modems, pagers, video and camera viewfinders, mobile phones, television monitors and other hand held devices.

In order for the first magnification optic 16 to magnify the source object 14, the first magnification optic 16 must be positioned some distance away from the source object 14. Thus when the display system is folded onto itself according to the present invention, the microdisplay must be positioned in the proximity of the second magnification optic 26. Accordingly, the microdisplay 12 is preferably positioned within about 8 mm of either the proximal 28 or distal 30 refractive surface of the second magnification optic 26. In a preferred embodiment, the microdisplay 12 is positioned adjacent, i.e., within about 3 mm, of either the proximal 32 or distal 34 refractive surface of the second magnification optic 26. In an alternate embodiment, the microdisplay 12 is incorporated within the second magnification optic 26.

FIG. 1 illustrates an embodiment of the present invention in which the microdisplay 12 is positioned adjacent the distal refractive surface 34 of the second magnification optic 26. According to this embodiment, the source object 14 produced by the microdisplay 12 is imaged by the first magnification optic 16 such that the first magnification optic 16 provides a magnified virtual image 20 of the source object 14 where the imaging rays 22 forming the magnified virtual image 20 have a center which defines the second optical axis 24. The second magnification optic 26 then reimages the magnified virtual image 20 and provides a compound magnified virtual image 28 of the source object 14 to the observer 30.

When the microdisplay 12 is positioned near or adjacent to the distal refractive surface 34 of the second magnification optic 26, the first magnification optic 16 preferably has a magnification of between about 3 and 10 and a focal length between about 7.5 and 30 mm.

In this embodiment, the second magnification optic 26 preferably has a magnification of between about 3 and 10 and a focal length between about 25 and 83 mm. It is also preferred that the eye relief provided by the second magnification optic 26 be equal to or greater than about 15 mm, more preferably equal to or greater than about 25 mm, most preferably equal to or greater than about 35 mm.

Figure 3:
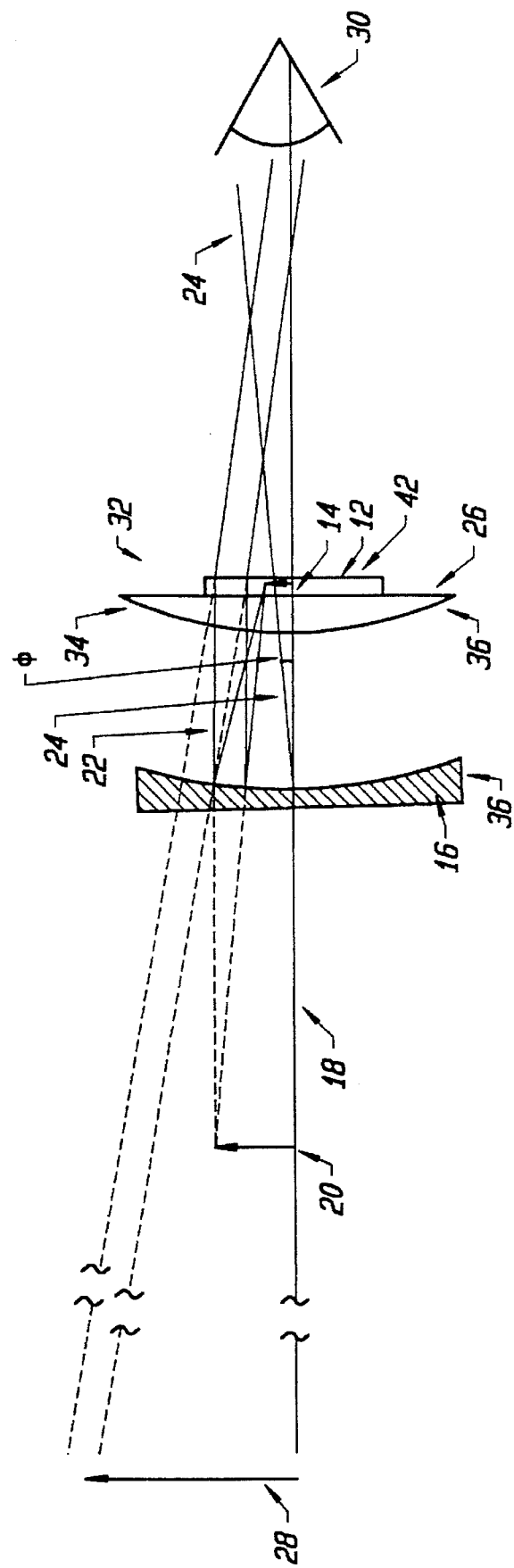
FIG. 3 illustrates an alternative embodiment of the display system of the present invention in which the microdisplay is positioned adjacent the proximal refractive surface of the second magnification optic.

FIG. 3 illustrates an alternative embodiment of the present invention in which the microdisplay 12 is positioned adjacent the proximal refractive surface 32 of the second magnification optic 26. According to this embodiment, the source object 14 produced by the microdisplay 12 is imaged by a doublet 36 formed by the combination of the second magnification optic 26 and the first magnification optic 16 such that doublet 36 provides a magnified virtual image 20 of the source object 14 where the imaging rays forming the magnified virtual image 20 have a center which defines the second optical axis 24. In this embodiment, because the microdisplay is positioned in close proximity to the second magnification optic 26, the second magnification optic 26 does not significantly alter the appearance of the source object 14 when the source object first passes through the second magnification optic 26 toward the first magnification optic 16.

The doublet 36 formed by the first and second magnification optics in this embodiment preferably provides a magnification of between about 3 and 10 and preferably has a focal length between about 7.5 and 30 mm. In this embodiment, the second magnification optic 26 also preferably provides a magnification of between about 3 and 10 and a focal length between about 25 and 83 mm when the magnified virtual image 20 is imaged by the second magnification optic 26. It is also preferred that the eye relief provided by the second magnification optic 26 be equal to or greater than about 15 mm, more preferably equal to or greater than about 25 mm, most preferably equal to or greater than about 35 mm.

Figure 4:
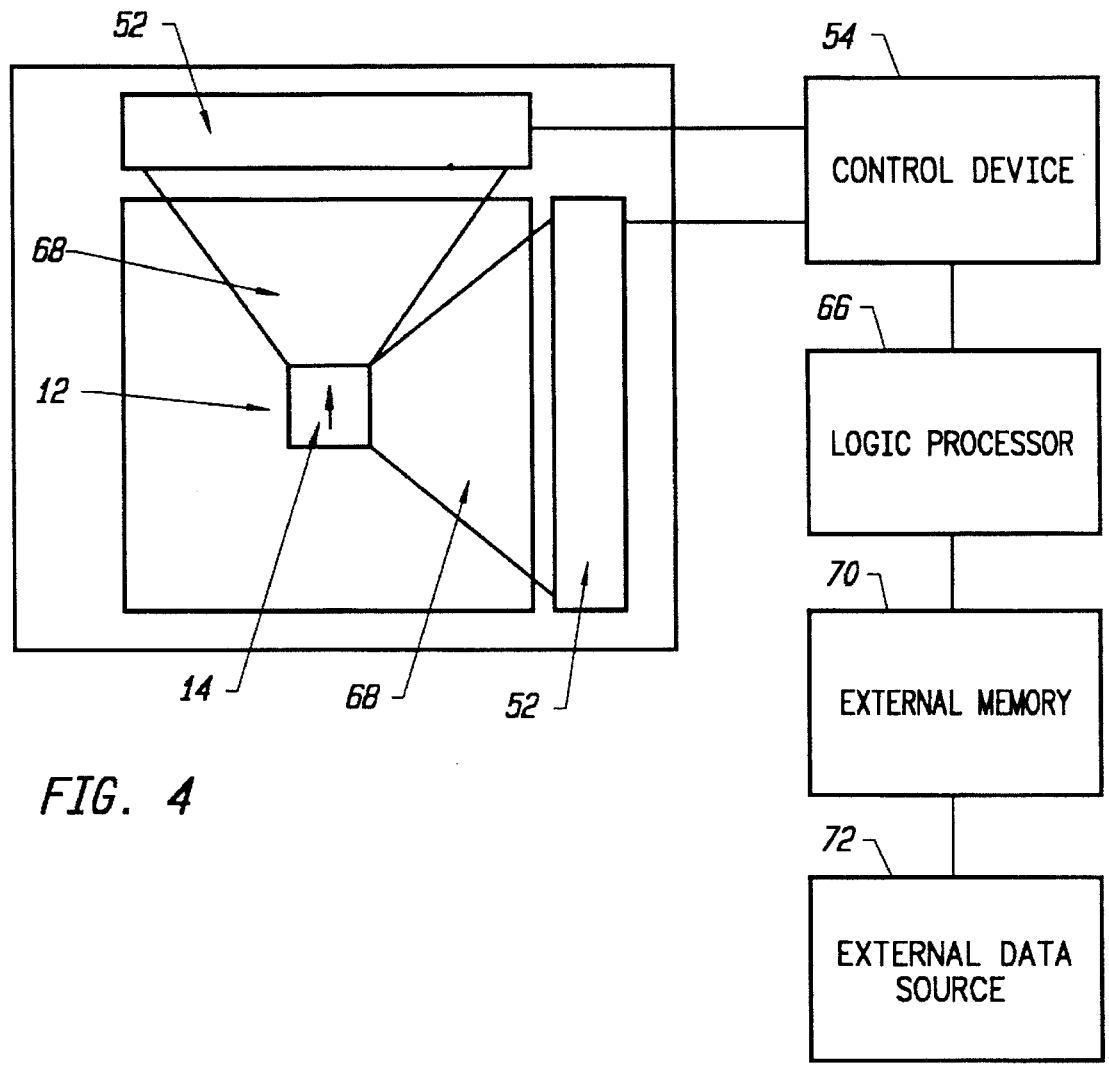
FIG. 4 illustrates the electronics included within the display system for controlling the microdisplay.

FIG. 4 illustrates the electronics included within the display system for controlling the microdisplay. As illustrated in FIG. 4, the microdisplay includes an input 52 which is electronically attached by electrodes 68 to the microdisplay 12. Also connected to the input 52 is a control device 54 for conveying electrical signals through the input to control the generation of the source object 14. The control device 54 may also be connected to a logic processor 66 which is also connected to external memory 70 which may be controlled through an external data source 72. In a preferred embodiment, the microdisplay 12 is a row-column addressed display system. The microdisplay 12 is connected to the input 52 such as shift registers through optically transparent electrodes 68 such as indium tin oxide or any other suitable optical transparent conducting material. The input 52, shift registers are connected to a control, device 54 such as a character generator with timing and decoding logic. The control device 54 is controlled by a processor 66 which manipulates the data from the external memory 70. The external memory receives the information from the external data source 72 such as an external radio receiver. The external data source 72 could also be infrared diode data link to another computer, LAN system, or any other device capable of sending analog or digital communications. In a preferred embodiment, the external memory 70 and external data source 72 is a separate PCMCIA card which can be connected to a computer or communication system.

Figure 5:
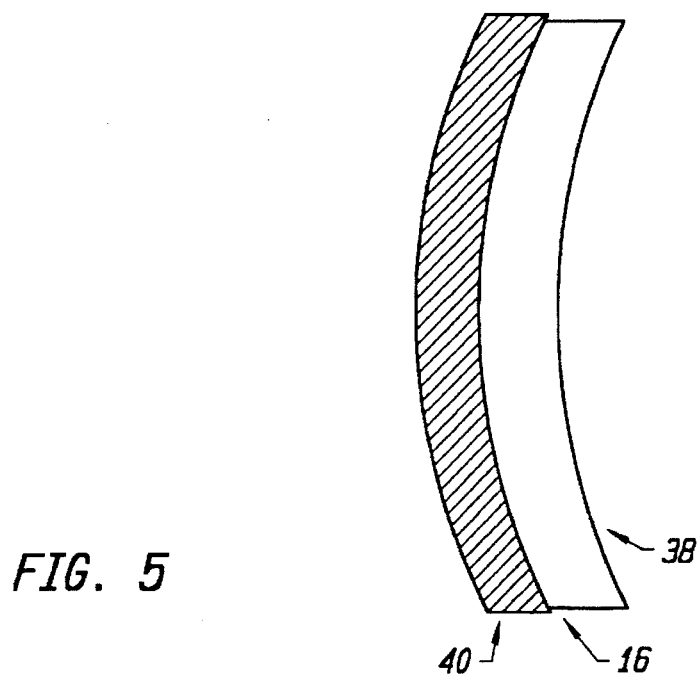
FIG. 5 illustrates a first magnification optic which includes a refractive function provided by a proximal surface of the first magnification optic and a reflective function provided by a distal surface of the first magnification optic.

Regardless of whether the microdisplay 12 is positioned near the proximal 32 or distal 34 surface of the second magnification optic 26 or within the second magnification optic 26, the first magnification optic 16 may be modified as illustrated in FIG. 5 to include a refractive function provided by the proximal surface 38 of the first magnification optic 16 and a reflective function provided by the distal surface 40 of the first magnification optic 16. The refractive function provided by the proximal surface 38 may be used to offset any distortions created by the other optics in the system in order to provide a compound magnified virtual image which is as minimally distorted as possible. For example, the refractive function provided by the proximal surface 38 may be used to correct aberrations in the system including, but not limited to spherical aberrations, astigmatism, coma, distortion and field curvature.

Figure 6:
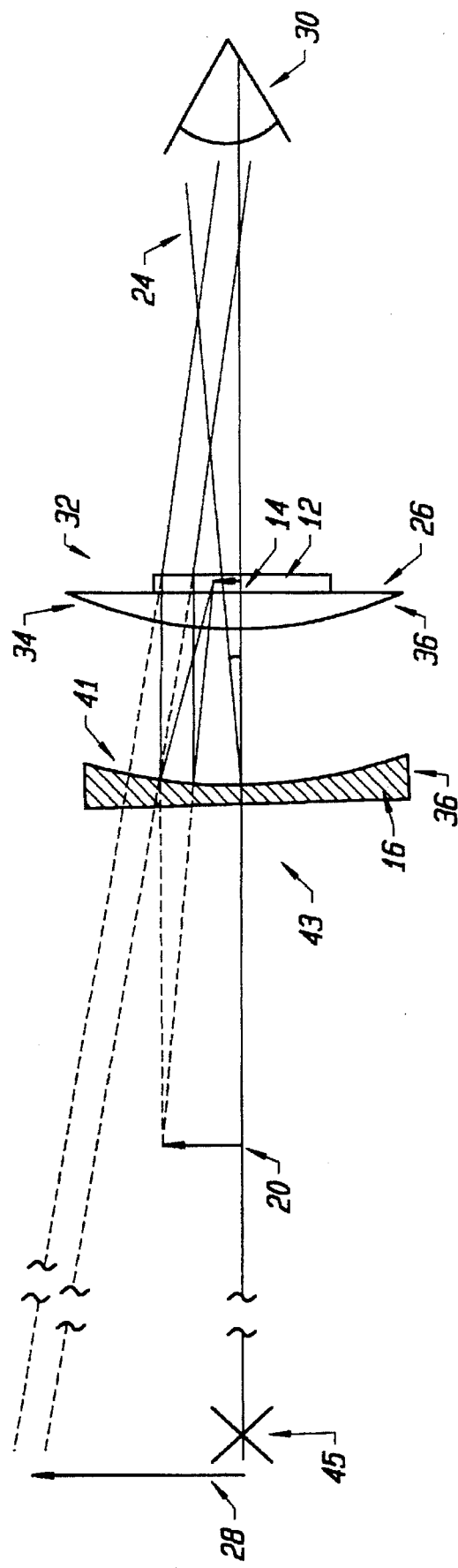
FIG. 6 illustrates a first magnification optic which includes a partially reflective surface for use in head-up displays.

The first magnification optic 16 may also be modified as illustrated in FIG. 6 to include a partially reflective surface 41 such that a observer 30 viewing the compound magnified virtual image 28 can also visualize real objects 45 positioned behind 43 the first magnification optic 16. In this regard, the partially reflective surface 41 is designed to provide an undistorted view of the real objects positioned behind 43 by offsetting any distortions created by the other optics in the system. A display system employing this design is particularly suited for use in a head-up display system where an electronically generated image, such as the compound magnified virtual image 28 is superimposed with a real object positioned behind the display system.

The first magnification optic 16 and the second magnification optic 26 may be designed to introduce field curvature into the magnified virtual image 20 and the compound magnified virtual image 28 respectively such that a complementary degree of positive and negative field curvature is introduced by each optic. Accordingly, it is particularly preferred that the first and second magnification optics 16, 26 be selected such that the first and second magnification optics 16, 26 act in concert to substantially eliminate any field curvature introduced by either magnification optic individually. Elimination of field curvature in this manner can be performed regardless of whether the microdisplay 12 is positioned near the proximal 32 or distal 34 surface of the second magnification optic 26.

With regard to all of the above-described embodiments, the first and second magnification optics 16, 26 can be used to magnify the source object 14 formed by the microdisplay 12 by a factor equal to or greater than about 10 and more preferably equal to or greater than a factor of about 20. By using two separate magnification optics, the display of the present invention is able to employ smaller components and a more compact layout than would be possible using a single magnification optic, thereby enabling the display to be positioned within a compact space. In addition, by employing two stages of magnification, the degree of magnification needed in the second stage is reduced which, in turn, provides the observer with a wider field of view and longer eye relief as compared to high power magnifying lens. In addition, the second magnification optic can be focused at a point near infinity which reduces the amount of eye strain caused when the observer focuses his or her eyes on the synthesized display.

Figure 7A:
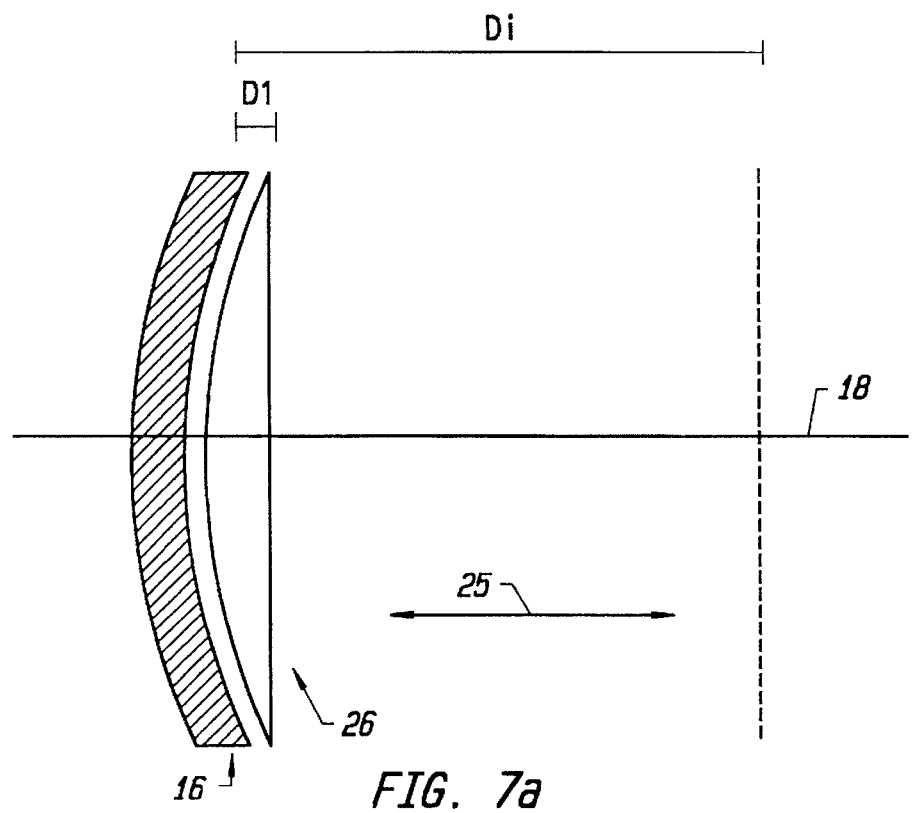
Figure 7B:
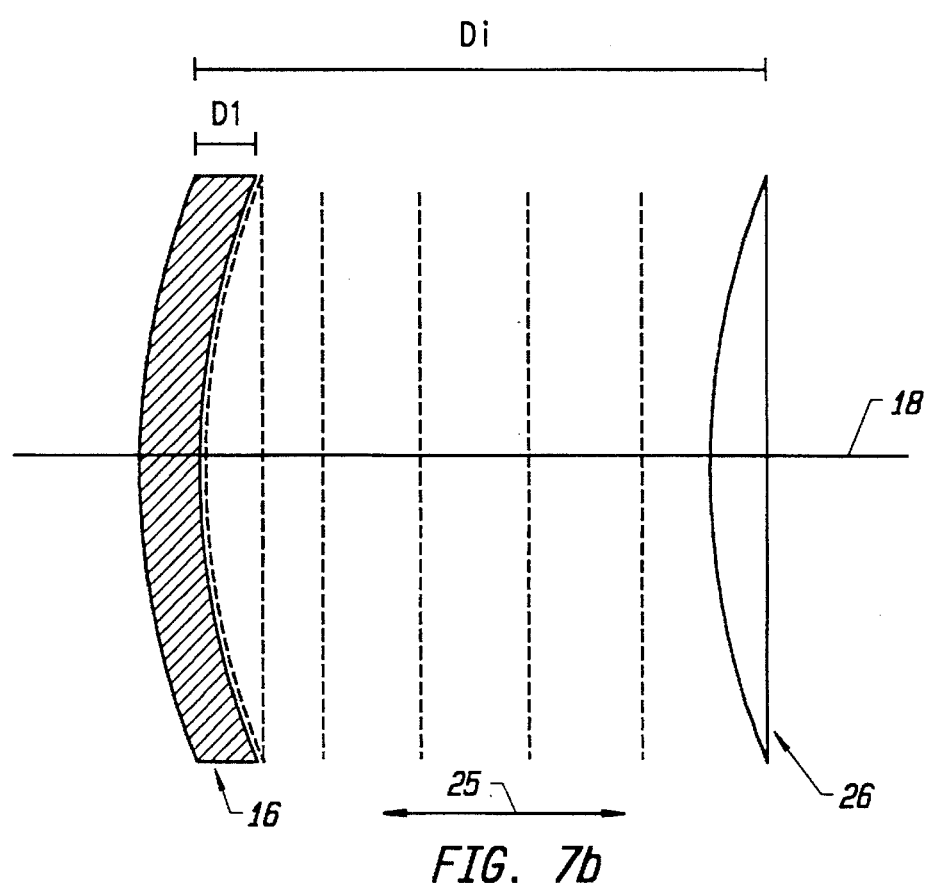

With regard to all of the above-described embodiments, the display system can be modified to be expandable and contractible along the first optical axis 18. As illustrated in FIG. 7A, the display system can be contracted such that the first magnification optic 16 is brought in contact with the second magnification optic 26. As illustrated in FIG. 7B, the display system can be expanded by increasing the distance 25 between the first magnification optic 16 and the second magnification optic 26. When the display system is expandable and contractible, the display system may be designed such that there are a series of distances $D_1-D_i$ at which the first magnification optic 16 may be positioned relative to the second magnification optic 26. In an alternate, preferred embodiment, the distance 25 between the first magnification optic 16 and the second magnification optic 26 can be adjusted to any distance between $D_1$ and $D_i$.

When the display system is in a contracted state, eye relief provided by the display system is maximized. However, the magnification provided by the display system is reduced. As the display system is expanded, the magnification provided by the display system increases and the eye relief decreases. The adjustability of the separation between the first magnification optic 16 and the second magnification optic 26 thus provides the observer with the ability to adjust the magnification and ergonomics of the display system.

According to this embodiment, the display system includes a distance adjusting mechanism which adjusts the distance between the first and second magnification optics. The distance adjusting mechanism is preferably controllable by the observer.

The display system also preferably includes a distance sensing mechanism which senses the distance 25 between the first and second magnification optics and conveys a control signal to the control device 54 indicating the distance. Information regarding the distance between the first magnification optic 16 and the second magnification optic 26 can then be employed by the control device 54 to modulate the source object formed by the microdisplay. For example, the sensed distance between the first and second magnification optics can be used by the control device 54 to modulate the size of the characters formed by the microdisplay since the distance 25 dictates the magnification of the source object 14 provided by the display system.

Modulation of the source object may be performed automatically or in response to a control signal provided by the observer (e.g., the observer presses a button). For example, the display system may include a control mechanism which enables the observer to modify the size of the source object by sending a control signal to the control device.

Modulation of the magnification and focus of the display system may also be performed automatically or in response to a control signal provided by the observer. For example, the display system may include a control mechanism which enables the observer to control the distance adjusting mechanism, thereby controlling the distance between the first and second magnification optics.

The microdisplay 12 used in the display system 10 of the present invention may be any electronically activated display which can produce a source object of any type. For example, the microdisplay may be a liquid crystal display, a spatial light modulator, a grating, a mirror light valve or a LED array. Microdisplays may generally divided into two categories, opaque and light transmissive displays. The microdisplays illustrated in FIGS. 1 and 3 are light transmissive microdisplays.

When the microdisplay is opaque, the microdisplay does not permit light to pass through the display. Therefore, when an opaque microdisplay is positioned within the full field of view, one must look around the microdisplay in order to see the compound magnified virtual image. When the microdisplay is larger than the pupil size of the eye, generally between about 3–7 mm, substantial vignetting of the compound magnified virtual image can occur. It is therefore preferred that an opaque microdisplay be as small as possible, preferably equal to or less than 49 mm$^2$ and more preferably equal to or less than 9 mm$^2$.

When the microdisplay is light transmissive, it is possible to view the compound magnified virtual image by looking through the microdisplay. Therefore, there is no size constraint on the microdisplay when the microdisplay is substantially light transmissive such that the microdisplay may be larger than the pupil size of the eye. A scattering mode liquid crystal display is an example of a substantially light transmissive microdisplay.

The microdisplay 12 preferably produces a source object having a surface area equal to or less than about 25 mm$^2$, most preferably equal to or less than about 9 mm$^2$. However, it should be understood that microdisplays which can produce larger source objects may be employed. It is also preferred that the microdisplay 12 form a source object 14 using an array of pixels 11 on the microdisplay 12 wherein each pixel has an area equal to or less than about 1600 square microns, more preferably equal to or less than about 25 square microns.

In one embodiment of the present invention, the microdisplay 12 used to form the source object 14 is a spatial light modulator. Spatial light modulators, also known as light valves, are well known in the art for use in electronic display systems. In general, a spatial light modulator includes an addressable array of light modulating mirror elements which modulate incident light in a spatial pattern to produce an image. The array of modulating elements are modulated in response to an electrical or optical input where each light modulating element corresponds to a pixel of the image generated by the light modulator. Incident light may be modulated by the modulating elements with regard to phase, intensity, polarization, or direction. Light modulation may be achieved using a variety of materials exhibiting electrooptic or magnetooptic effects and by materials that modulate light by surface deformation. Electrical control of the addressable mirror elements forming the spatial modulator is described in U.S. Pat. No. 4,441,791 issued to Hornbeck which is incorporated herein by reference. In the present invention, a spatial light modulator is used to form a source object which is then magnified in two magnification stages. Examples of spatial light modulators that may be used in the synthesized display of the present invention and their principle of operation are described in U.S. Pat. Nos. 4,638,309, 4,680,579 issued to Ott, U.S. Pat. No. 5,287,215 issued to Warde, U.S. Pat. Nos. 4,441,791, 4,710,732, 4,596,992, 4,615,595, 4,662,746 and 5,061,049, 5,280,277 issued to Hornbeck, U.S. Pat. No. 5,287,096 and U.S. Pat. No. 5,170,283 issued to O'Brien, all of which are incorporated herein by reference.

In a preferred embodiment, the microdisplay is a light transmissive microdisplay. As illustrated in FIG. 2, when the microdisplay 12 is a light transmissive microdisplay, the imaging rays 22 forming the magnified virtual image 20 may be arranged in such a manner that the second optical axis is aligned relative to the first optical axis such that the source object 14 produced by the microdisplay 12 is within the field of view 25 of the compound magnified virtual image 28. This generally requires that the second optical axis 24 be within about 40° of the first optical axis 18. According to this embodiment, the observer is able to effectively look through the light transmissive microdisplay to visualize the compound magnified virtual image 28 because the microdisplay 12 is positioned in the near field of the observer's vision when the observer is focusing on the compound magnified virtual image 28 which appears to be positioned in the observer's far field of vision.

In general, a light transmissive microdisplay is any electronically activated display which produces an image of any type which, when light is transmitted through the microdisplay, some fraction of the light passing through the display is not modulated by either phase, polarization, direction or intensity. For example, a number of liquid crystal displays modulate the polarization of light. By using a light polarizing liquid crystal display in combination with one or more polarizing elements, a substantially light transmissive microdisplay can be formed. In a particularly preferred embodiment, the liquid crystal display is a cholesteric-nematic phase transition liquid crystal display. This type of display scatters some of the light through the display.

Figure 8:
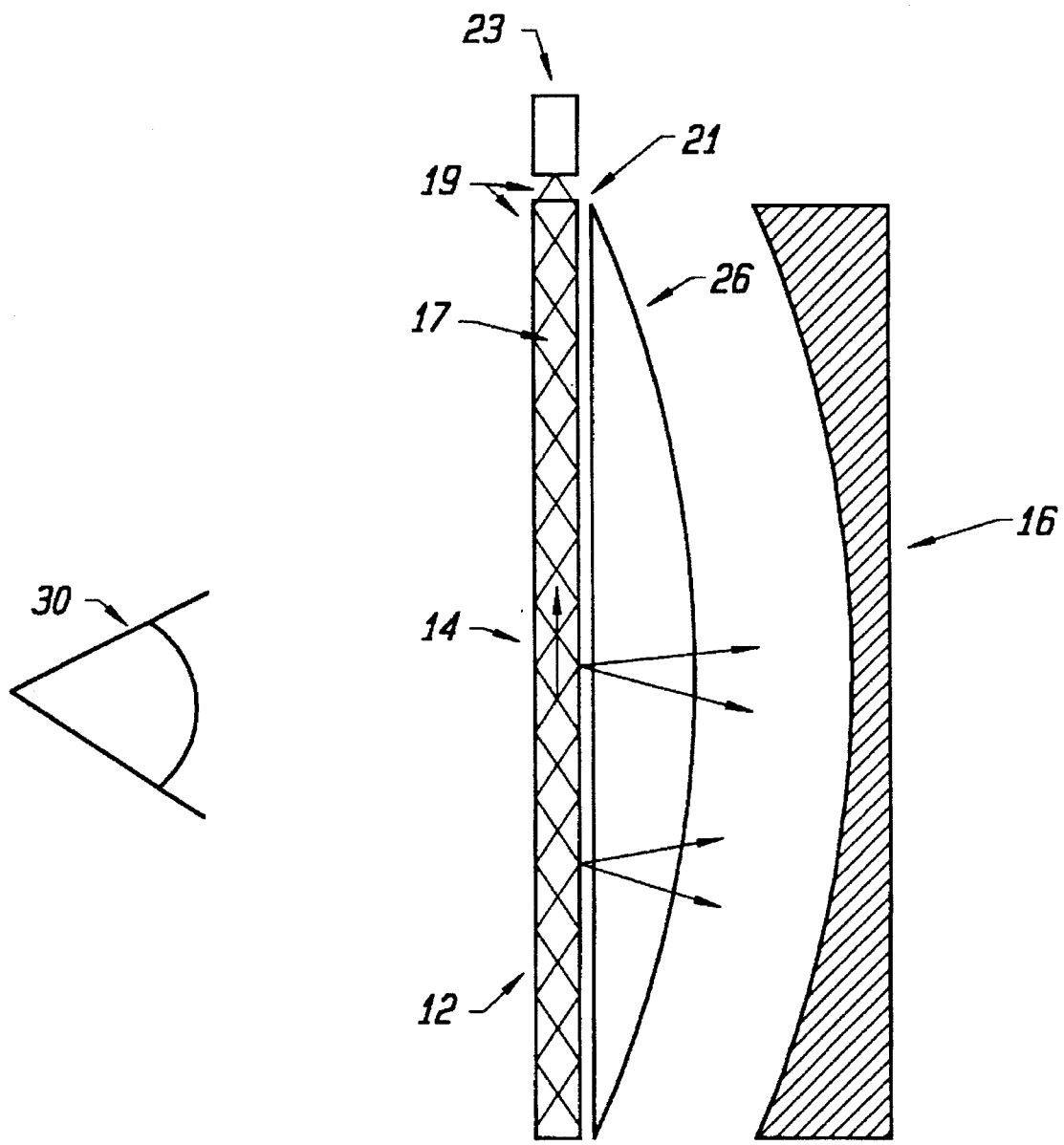
FIG. 8 illustrates a display system including an illumination source.

Illumination is generally required to project the source object 14 formed by the microdisplay 12 onto the first stage magnification optic 16. In one embodiment, illustrated in FIG. 8, the illumination needed to project the source object 14 onto the first stage magnification optic 16 is produced by an optical wave guide 17 formed by two glass plates 19 which are also used to form a cholesteric-nematic phase transition liquid crystal display microdisplay 12. Illumination is introduced into the wave guide 17 at one side 21 of the glass plates 19 by an illumination source 23. The illumination introduced into the wave guide 17 is then scattered by the cholesteric-nematic phase transition liquid crystal display such that some of the illumination is directed toward the first magnification optic 16.

One of the significant advantages of employing a reflective first magnification optic where the optical train of the display system is folded onto itself is the increased light efficiency that is achieved. Beam splitters and/or optical gratings are typically used in conjunction with reflective optics in prior art display systems. However, by eliminating the need for a beam splitter or an optical grating in the display system of the present invention, the light efficiency of the display is significantly increased. As a result, the ultimate brightness of the compound magnified virtual image seen by the observer is enhanced. Further, because the display system is designed to direct most of the imaging light toward the observer's eye, the amount of light needed to illuminate the exit pupil of the device is significantly smaller than in traditional displays.

Electronic devices using the display system of the present invention will generally be portable. Given that the illumination source used in the electronic display generally requires the greatest amount of energy of the various components used in an electronic display, the lower level of illumination required by the display system of the present invention significantly increases the lifetime of the power supply used to energize the display system.

In a preferred embodiment, the electronic display also includes an intermediate image synthesizing optic which provides a synthesized electronic display with enhanced eye relief and a wider field of view than is possible using a traditional compound magnification system. For example, the synthesized electronic display enables the observer to view the display over a 34 degree full angle field of view with at least about a 35 mm eye relief.

The image synthesizing optic 42 should be positioned at or adjacent to the source object plane. Thus, the image synthesizing optic 42 is preferably positioned adjacent to or integrally incorporated into the microdisplay 12.

The image synthesizing optic 42 may be any optic which produces a directly viewable image when placed in the source object plane of a magnification optic. For example, as illustrated in FIG. 3, the image synthesizing optic 42 may be a light transmissive microdisplay 12.

The image synthesizing optic 42 is preferably designed such that a large fraction of the light is redirected so that the entirety of the image remains visible as the eye is moved laterally relative to the second stage magnification optic 26. In order to achieve the desired amount of light redirection, the numerical aperture of the directed light is preferably on the order of the (radius of the second stage magnification optic)/(focal length of the second stage magnification optic).

Figure 9:
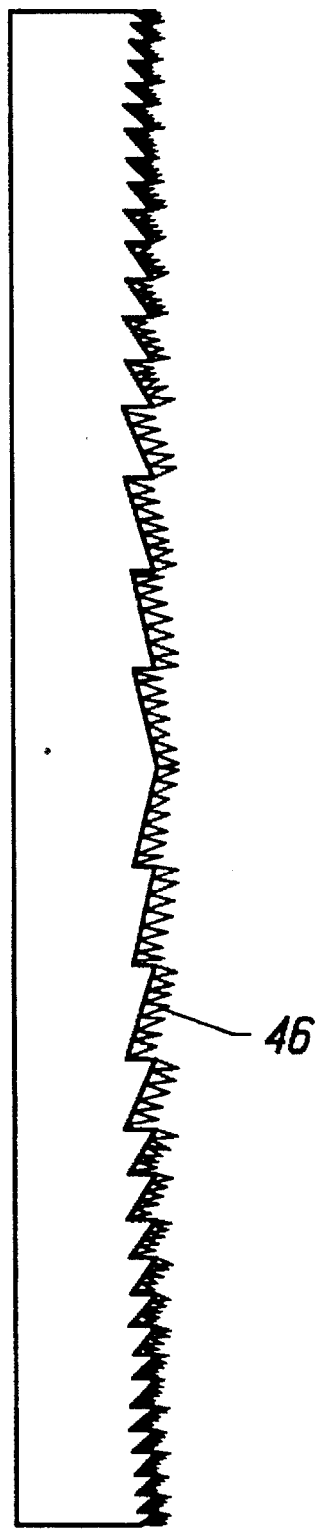
FIG. 9 illustrates an image synthesizing optic formed of a series of micro lenses.

A suitable light redirecting image synthesizing optic is illustrated in FIG. 9 in which a series of micro lenses 46 on the order 5–10 microns in diameter are used to form small focal length positive or negative lenses. The outputs of the micro lenses may be tilted to direct a large fraction of the light towards the exit pupil of the second magnification optic 26.

When a light transmissive image synthesizing optic is employed, the image synthesizing optic should be substantially transparent. In addition, the image synthesizing optic can be diffuse such that light is scattered as the light passes throughout the diffusing material. The diffusive scatter performs the function of modifying the numerical aperture of the light. Examples of suitable light diffusing image synthesizing optic materials include ground glass, opal glass, holographic diffusers, thin diffusive plastics such as polystyrene and molded plastic with diffusing surfaces. In a particularly preferred embodiment, a light transmissive microdisplay is employed which serves the dual function of the microdisplay 12 and the intermediate synthesizing optic 42.

When a light diffusive material is used, the diffusive material should be thinner than the size of the pixels projected onto the image synthesizing optic to prevent secondary scattering of the light within the diffusive material into neighboring pixels, thereby blurring the pixels. Pixel blurring due to secondary scatter may be overcome using an array of pixels formed of a diffusive material as illustrated in FIG. 10.

Figure 10:
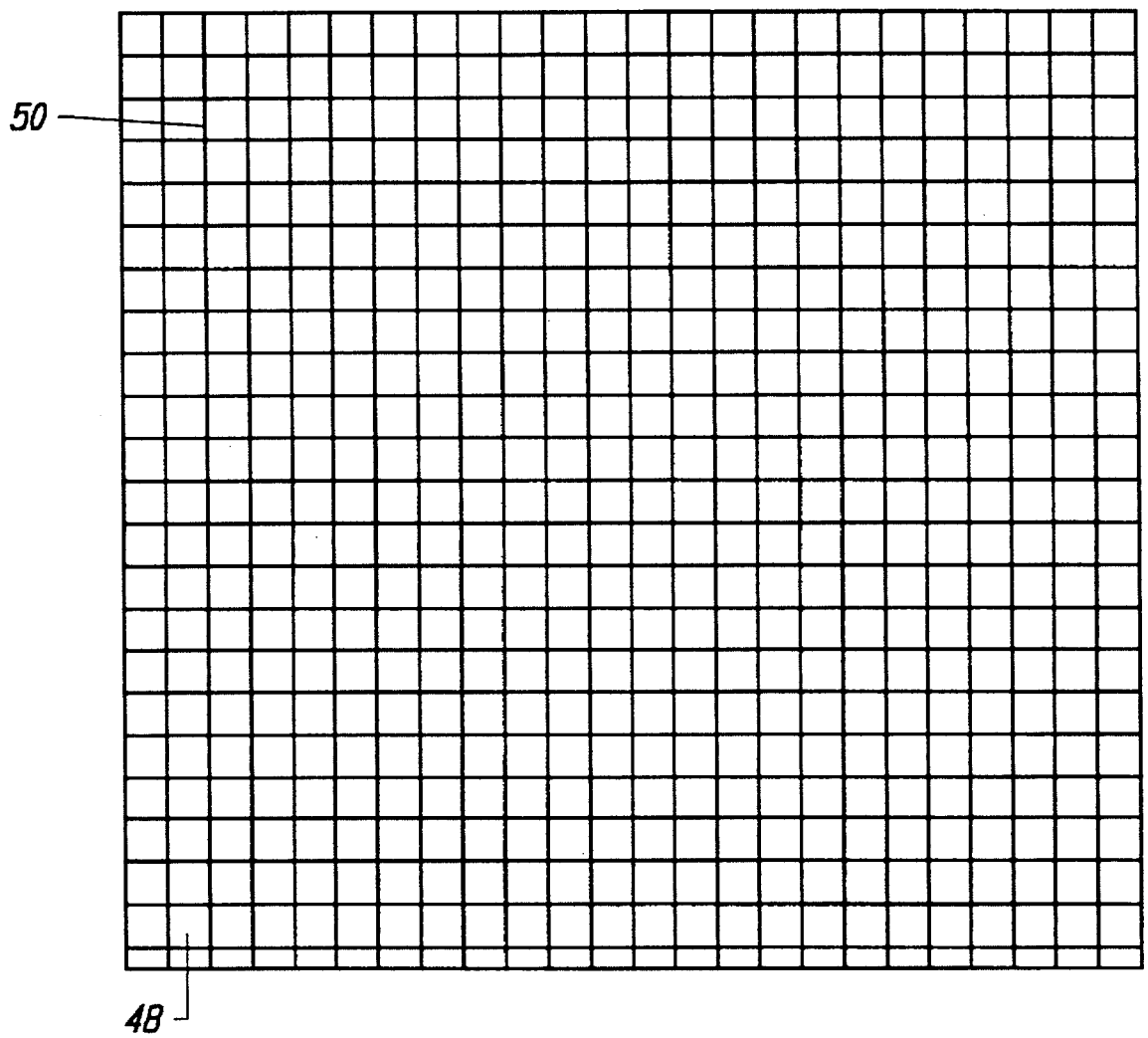
FIG. 10 illustrates an array of pixels formed of a diffusive material for use as an image synthesizing optic.

As illustrated in FIG. 10, the diffusive image synthesizing optic is composed of an array of individual pixels 48 where each pixel is separated by opaque barrier 50 which prevents light from one pixel from being scattered by secondary scatter into a neighboring pixel. The opaque barrier 50 is preferably reflective but may also form a light absorbing barrier.

In a further, preferred embodiment, the display system includes an eye position sensor system which enables the observer to use his or her eye to interact with a control device. Through this interaction, the eye position sensor system may be used to control the source object produced by the microdisplay. The eye position sensor system may also be used to control a variety of functions performed by the display system, for example, directing a printer to print a document or directing a facsimile machine to send a message. According to this embodiment, the position of the observer's eye is detected and used, much like a cursor, to interact with the controlling device 54 to control the source object 14 produced by the microdisplay 12.

Devices, such as eye trackers and occulometers, for detecting the position of the eye, are well known in the art. For example, suitable devices which may be used in conjunction with the virtual mouse sensor system include the devices described in U.S. Pat. No. 4,513,317, which is incorporated herein by reference United Kingdom Patent Application GB 2270171A also describes an occulometer which may be used with the virtual mouse sensor system.

Figure 11:
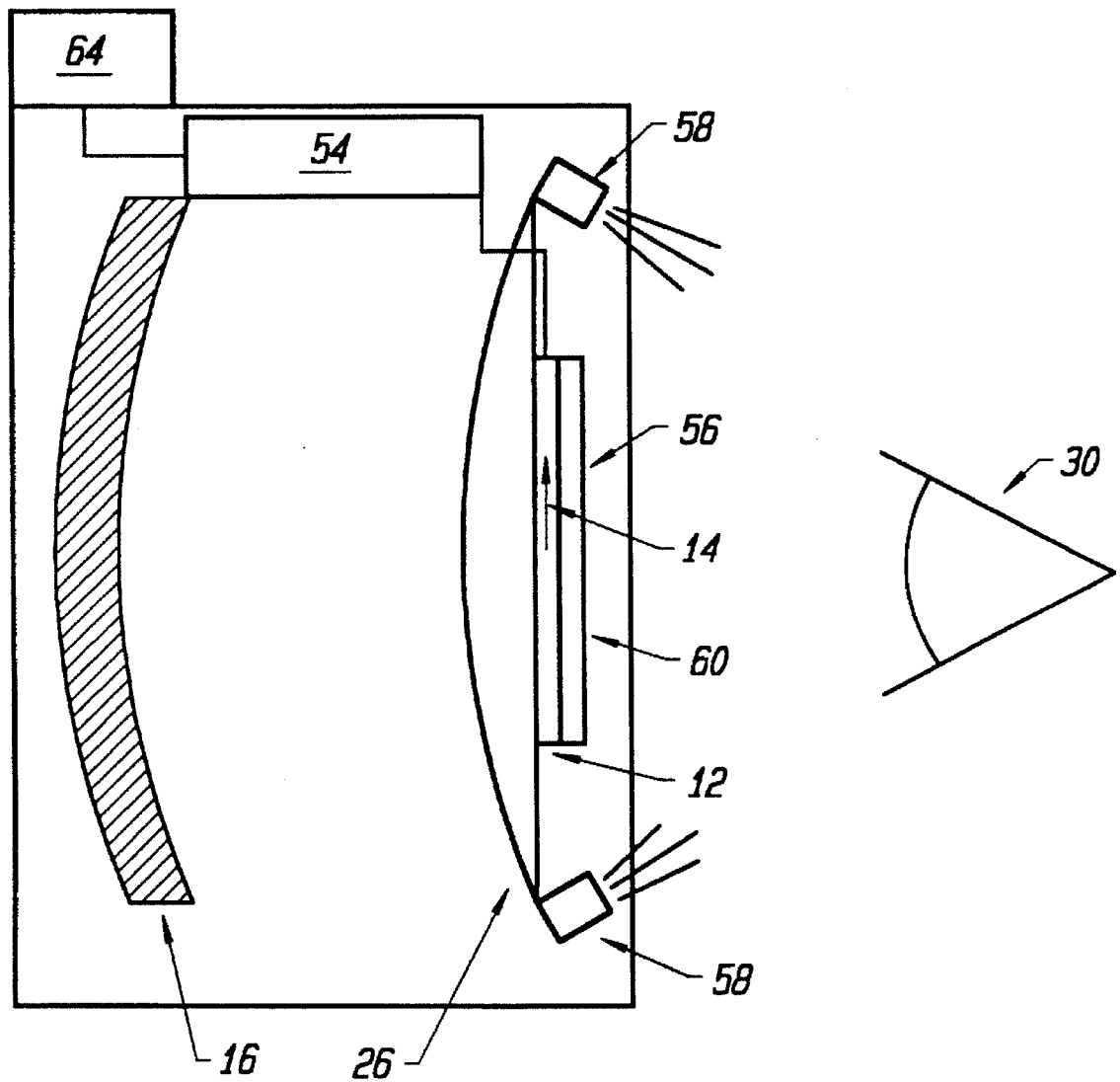
FIG. 11 illustrates an embodiment of the display system which includes an eye position sensor system which enables the observer to use his or her eye to interact with a control device which controls the source object produced by the microdisplay and/or functions that the display system performs.

In one embodiment illustrated in FIG. 11, the eye position sensor system includes a light emitting diode (LED) 58 positioned around the perimeter of the second magnification optic 26 for providing illumination in the direction of the observer's eye 30. The illumination is preferably in the infrared region. The eye position sensor system 56 also includes a detector array 60 positioned adjacent to the microdisplay 12 for detecting reflections of the illumination from the LED 58 off of the retina 62 of the observer's eye 30, the reflections serving to indicate the position of the observer's eye 30. The eye position sensor system 56 also includes a control mechanism 64 which the observer uses in combination with the detector array 60 to interact with the controlling device 54 to control the source object 14 produced by the microdisplay 12.

The control mechanism 64 may be, for example, a button which the observer 30 depresses to indicate that the observer is looking at a selected item, such as a computer software icon. The control mechanism 64 may also be a timing mechanism which determines that the observer has selected an item based on the amount of time that the observer is looking in a particular direction.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A compact virtual image electronic display system comprising:

a microdisplay for producing a source object;

a first magnification optic for providing a magnification function and a reflection function, the microdisplay and the first magnification optic each having a centerpoint defining a first optical axis, the first magnification optic magnifying the source object and reflecting a magnified virtual image, the center of the magnified virtual image defining a second optical axis, the second optical axis being at an angle φ relative to the first optical axis;

a second magnification optic for providing a compound magnified virtual image of the magnified virtual image to an observer, the angle φ between the first and second optical axes being sufficiently small that the source object is within the full field of view provided by the second magnification optic; and a control mechanism for providing control signals to the microdisplay which modifies the source object produced by the microdisplay.

2. The display system according to claim 1 wherein the microdisplay is a light transmissive microdisplay.

3. The display system according to claim 1 wherein the microdisplay is within about 8 mm of the second magnification optic.

4. The display system according to claim 3 wherein the microdisplay is positioned adjacent to the second magnification optic.

5. The display system according to claim 1 wherein the spacing between the first and second magnification optic is equal to or less than about 15 mm.

6. The display system according to claim 5 wherein the spacing between the first and second magnification optic is equal to or less than about 8 mm.

7. The display system according to claim 1 wherein the thickness of the display system along the first optical axis is equal to or less than about 20 mm.

8. The display system according to claim 1 wherein the first and second magnification optics are selected such that the second magnification optic reduces the degree of field curvature introduced by the first magnification optic.

9. The display system according to claim 8 wherein the first and second magnification optics are selected such that the second magnification optic substantially eliminates field curvature introduced by the first magnification optic.

10. The display system according to claim 1 wherein the first magnification optic includes a refractive surface proximal to the observer and a reflective surface distal to the observer.

11. The display system according to claim 1 wherein the reflective function of the first magnification optic is partially light transmissive such that the observer viewing the compound magnified virtual image can also view real objects through the first magnification optic.

12. The display system according to claim 1 wherein the microdisplay is positioned between the second magnification optic and the observer, the first and second magnification optics forming a doublet magnification optic.

13. The display system according to claim 12 wherein the microdisplay is positioned within about 8 mm of the second magnification optic.

14. The display system according to claim 13 wherein the microdisplay is positioned within about 3 mm of the second magnification optic.

15. The display system according to claim 12 wherein the first magnification optic includes a refractive surface proximal to the observer and a reflective surface distal to the observer.

16. The display system according to claim 12 wherein the reflective function of the first magnification optic is partially light transmissive such that the observer viewing the compound magnified virtual image can also view real objects through the first magnification optic.

17. The display system according to claim 1 wherein the microdisplay is positioned between the first magnification optic and the second magnification optic.

18. The display system according to claim 17 wherein the microdisplay is positioned within about 8 mm of the second magnification optic.

19. The display system according to claim 17 wherein the microdisplay is positioned within about 3 mm of the second magnification optic.

20. The display system according to claim 17 wherein the first magnification optic includes a refractive surface proximal to the observer and a reflective surface distal to the observer.

21. The display system according to claim 17 wherein the reflective function of the first magnification optic is partially light transmissive such that the observer viewing the compound magnified virtual image can also view real objects through the first magnification optic.

22. The display system according to claim 1 wherein the microdisplay is incorporated within the second magnification optic.

23. The display system according to claim 1 further including an eye position sensor for detecting a portion of the full field of view on which the eye is focused.

24. The display system according to claim 1 wherein the microdisplay is a cholesteric-nematic phase transition liquid crystal display.

25. The display system according to claim 1 wherein the distance between the first and second magnification optic along the first optical axis is adjustable.

26. The display system according to claim 25 wherein the distance between the first and second magnification optic is adjustable by the observer.

27. The display system according to claim 25 wherein the display system further includes a distance adjusting mechanism for adjusting the distance between the first and second magnification optics.

28. The display system according to claim 27 wherein the display system further includes a distance sensing mechansim which senses the distance between the first and second magnification optics and communicates the distance to the control mechanism which modifies the source object in response.

29. A compact virtual image electronic display system comprising:

a microdisplay for producing a source object;

a first magnification optic for providing a magnification function and a reflection function, the microdisplay and the first magnification optic each having a centerpoint defining a first optical axis, the first magnification optic magnifying the source object and reflecting a magnified virtual image, the center of the magnified virtual image defining a second optical axis, the second optical axis being at an angle φ equal to or less than about 10° relative to the first optical axis;

a second magnification optic for providing a compound magnified virtual image of the magnified virtual image to an observer;

a control mechanism for providing a control signal to the microdisplay which modifies the source object produced by the microdisplay.

30. The display system according to claim 29 wherein the angle φ is equal to or less than about 5°.

* * * * *